(No Model.) 2 Sheets—Sheet 1.

V. BÉLANGER.
CHANGE GEARING FOR BICYCLES.

No. 541,260. Patented June 18, 1895.

WITNESSES:
E. Batchelder
L. G. Collins

INVENTOR:
Victor Bélanger
by Wright, Brown & Quinby
Attys

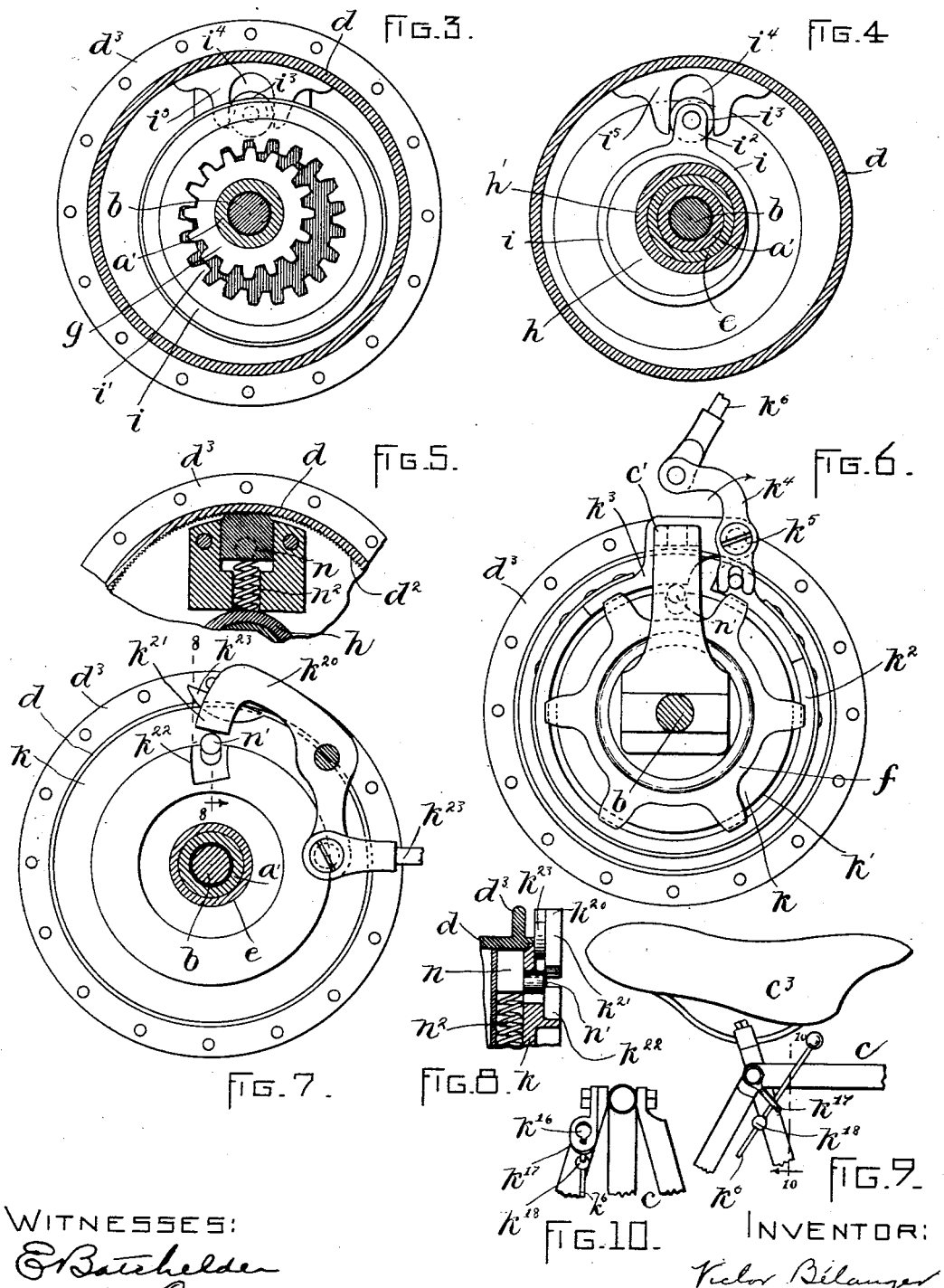

UNITED STATES PATENT OFFICE.

VICTOR BÈLANGER, OF BOSTON, MASSACHUSETTS, ASSIGNOR TO MARY E. BRADY, OF SAME PLACE.

CHANGE-GEARING FOR BICYCLES.

SPECIFICATION forming part of Letters Patent No. 541,260, dated June 18, 1895.

Application filed March 19, 1895. Serial No. 542,426. (No model.)

*To all whom it may concern:*

Be it known that I, VICTOR BÈLANGER, of Boston, in the county of Suffolk and State of Massachusetts, have invented certain new and useful Improvements in Change-Gearing for Bicycles, of which the following is a specification.

This invention relates to change gearing for bicycles, that is to say, gearing capable of adjustment for speed or power at the will of the rider.

The present invention involves numerous novel constructions and combinations of parts calculated to make a mechanism of this character superior to its predecessors in the matter of compactness, durability and reliability.

The claims which are appended hereto will be found to recite the characteristics of the invention.
An embodiment of the invention is illustrated in the accompanying drawings, whereof—

Figure 1:
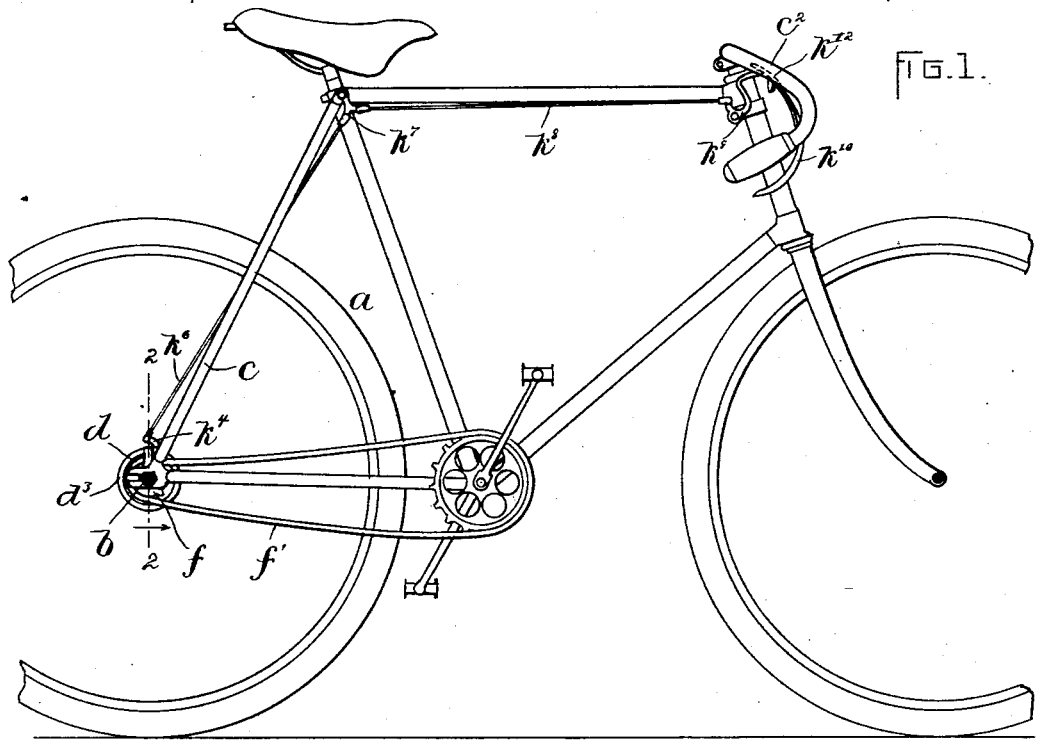
Figure 2:
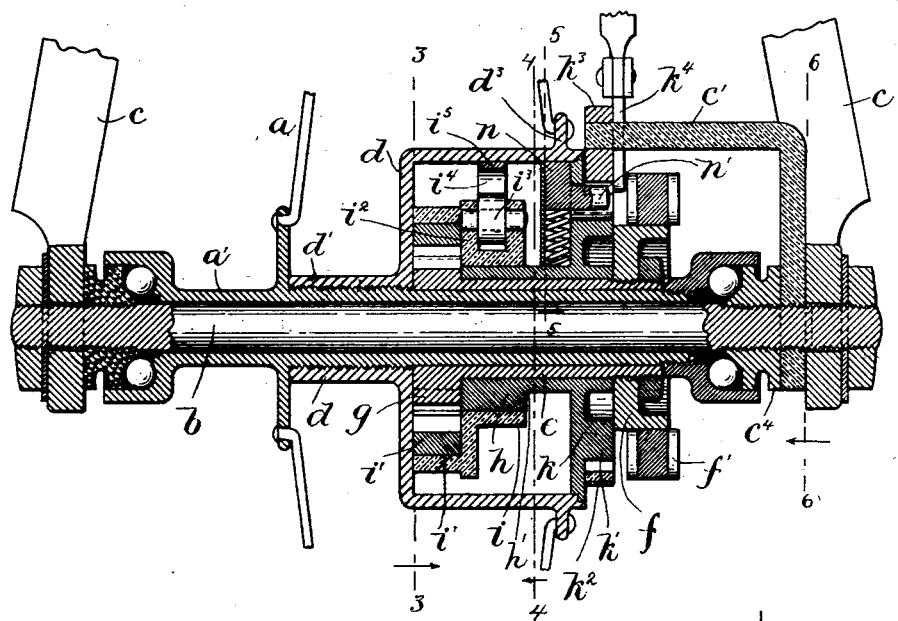

Figure 1 shows in side elevation the principal parts of a bicycle provided with my improvements. Fig. 2 shows an axial section taken on line 2 2 of Fig. 1. Figs. 3, 4, and 5 show sections taken, respectively, on lines 3 3, 4 4, and 5 5 of Fig. 2. Fig. 6 shows a section on line 6 6, Fig. 2, and an elevation of the mechanism at the left of said line. Fig. 7 shows a modification. Fig. 8 represents a section on line 8 8, Fig. 7. Fig. 9 represents a side view of the seat and parts of the frame, showing means for holding the detent in its operative position. Fig. 10 represents a section on line 10 10, Fig. 9.

The letter $a$ represents the rear wheel of the bicycle whose hub, $a'$, is mounted as usual to rotate on a fixed axle, $b$, fastened in the frame, $c$. In the present instance there is fastened to the hub an annular casing, $d$, forming a part of the hub and having a flange, $d^3$, to which one set of spokes is fastened. A sleeve, $e$, is mounted loosely on the hub, $a'$, within the casing, $d$, one end of the sleeve projecting from the casing. To the outer end of said sleeve outside the casing is affixed a small sprocket-wheel, $f$, for engagement with the driving-chain, $f'$, and on the inner end of the sleeve within the casing there is formed a pinion, $g$. Loosely mounted on the sleeve, $e$, within the casing, there is an eccentric, $h$, which has a hub $h'$ extending outside the casing. A strap, $i$, embracing the eccentric is enlarged and extended to receive an internal gear, $i'$, which is in mesh with the pinion, $g$, said gear being affixed to the strap, $i$. Said eccentric strap carries an arm, $i^2$, having an anti-friction roller, $i^3$, which is movable in a radial slot, $i^4$, in an ear or bracket, $i^5$, affixed to the casing, $d$, said roller and slotted bracket constituting a self-adjusting connection between the eccentric and the wheel.

$n$ represents a coupler which is movable in a guide in the eccentric-flange, $k$, and is adapted to lock the eccentric to the casing and through the latter to the wheel, $a$. Said coupler is arranged to interlock with the inner surface of the casing, $d$, the latter being internally milled or knurled to form a corrugated surface, $d^2$, (Fig. 5,) adapted to engage the correspondingly corrugated outer surface of the coupler, $n$. A spring, $n^2$, normally presses the coupler outwardly into engagement with the corrugated surface, $d^2$. When the coupler, $n$, is interlocked with the casing, the eccentric is constrained to move with the wheel as a part of it. A stud, $n'$, projects from the outer side of the coupler, $n$, through a slot in the flange, $k$, and is arranged to be moved inwardly by the detent hereinafter described, the arrangement being such that when the said detent is operated to hold the eccentric stationary, the coupler, $n$, is disengaged from the casing.

The eccentric is provided with a plate or flange, $k$, which closes the outer side of the casing, $d$, and is provided for engagement with a detent controlled by the rider, whereby the eccentric may be locked or held stationary. Said detent is shown in Figs. 1, 2, 5 and 6 as a flexible strap or band brake, $k^2$, encircling a peripheral face, $k'$, on the eccentric-flange, $k$, one end of said brake being attached to a holder, $k^3$, affixed to an arm or bracket, $c'$, hereinafter described on the frame, $c$, while its other end is pivotally connected with a lever, $k^4$, which is pivoted at, $k^5$, to the arm, $c'$.

Means are provided whereby the rider may move the lever, $k^4$, and when said lever is moved in the direction indicated by the arrow in Fig. 6, it compresses the brake or detent, $k^2$, upon the face, $k'$, of the eccentric-flange, $k$, thus preventing rotation of said flange and of the eccentric connected therewith, the compressed brake at the same time bearing on the stud $n'$ and pressing the coupler, $n$, inwardly out of engagement with the casing, $d$, so that the eccentric is disengaged from the casing and from the wheel, $a$, at the same time that it is being locked.

An operating rod, $k^6$, is connected with the lever, $k^4$, and extends upwardly on the frame, $c$. Said rod may be engaged at its upper end with a key-hole shaped slot, $k^{16}$, in a lug, $k^{17}$, affixed to the frame, $c$, directly under the saddle $c^3$, the rod having a fixed enlargement, $k^{18}$, adapted to pass through the larger part of the slot, and arranged so that when the brake or detent is loose and inoperative the enlargement will be below the lug, $k^{17}$. When the operator pulls the rod, $k^6$, upwardly until the enlargement, $k^{18}$, passes through the slot, he makes the detent operative to lock the eccentric as above described, and by moving the enlargement over the narrower part of the slot he engages the rod with the lug, $k^{17}$, so that it cannot fall back and release the detent, the latter remaining operative without attention from the rider.

In Fig. 1, I show the operating rod, $k^6$, connected by a lever, $k^7$, rod, $k^8$, and lever, $k^9$, with a hand lever, $k^{10}$, pivoted at $k^{12}$, to the handle-bar $c^2$, of the bicycle, said hand-lever bearing at one end on the lever, $k^9$, and being arranged so that when its outer end is drawn toward the handle-bar, its inner end will transmit motion to the detent through the described connections.

The detent supporting arm, $c'$, is clamped between the frame, $c$, and a collar, $c^4$, secured upon the axle, $b$, as shown in Fig. 2, said arm having a hole through which the axle passes.

A modified form of detent is shown in Figs. 7 and 8, in which the detent is a lever, $k^{20}$, pivoted at, $k^{21}$, to a suitable part of the bicycle frame and having at one end a tooth, $k^{21}$, adapted to enter a recess, $k^{22}$, in the eccentric-flange, $k$. An operating rod, $k^{23}$, is connected to the other end of said lever and is adapted to move the toothed end of the lever into engagement with the slot, $k^{22}$. An arm, $k^{23}$, is affixed to the lever, $k^{20}$, and is arranged to bear on the coupler stud $n'$, and displace the coupler when the lever is being moved to lock the eccentric.

It will be seen that in the construction shown in Figs. 2 and 6, the stud, $n'$, constitutes a means for displacing the coupler when the detent is operated to hold the eccentric stationary and that in the construction shown in Figs. 7 and 8 equivalent means for the same purpose are found in the stud, $n'$, and the arm, $k^{23}$.

The operation is as follows: In the normal condition of parts when the eccentric is locked to the wheel by the coupler, power applied to rotate the pinion, $g$, is transmitted directly to the wheel, $a$, the pinion and internal gear remaining in engagement at one side of the axis, and the bicycle is propelled the same as though the sprocket-wheel was affixed to the hub of the rear wheel as usual. To obtain increased power for hill-climbing or other purpose, the rider by moving the operating rod as described engages the detent with the eccentric-flange, $k$. When this takes place the eccentric is held stationary, the coupler, $n$, being at the same time displaced to disconnect said eccentric from the wheel, and then the pinion, $g$, turns the internal gear on the eccentric and the motion is transmitted through said gear to the wheel, the slotted projection, $i^5$, on the casing and the roll, $i^3$, on the eccentric strap constituting a self-adjusting connection between the casing and the internal gear, which permits the internal gear to move laterally or at right angles to its axis as required by its rotation on the fixed eccentric.

By arranging the change gearing on the rear wheel instead of on the crank-axle, I am enabled to reduce the difference in number of teeth between the driving pinion and the internal gear, and consequently the amount of radial movement of the internal gear with respect to the pinion, and yet I accomplish the same result in the matter of increasing power, for the reason that the rear sprocket-wheel is considerably smaller than that on the crank-shaft and makes a number of revolutions to one of the larger sprocket.

Another advantage resulting from reducing the difference between the driving pinion and the internal gear in the number of their teeth, is that these gears are more inclined to remain interlocked while the eccentric is free to rotate.

The construction is exceedingly compact and the gears are thoroughly protected from dirt.

I do not limit myself to the details of construction here shown and may variously modify the same. The eccentric-locking detent and the self adjusting connection between the internal gear and the wheel may be constructed in a variety of ways without departing from the spirit of my invention.

It will be seen that the casing, $d$, is in effect simply an enlargement of the hub, $a'$, and may properly be considered as a part of said hub.

My improvement can be readily applied to the existing standard bicycles and requires no adaptation of the frame of the bicycle, excepting to secure the arm, $c'$, thereto.

What I claim as my invention is as follows:

1. In a safety bicycle, the combination of a driven wheel, a driving pinion loose on the hub of said wheel, a rotatable eccentric having the same axis as the pinion and wheel, an internal gear journaled on the eccentric and meshing with the driving pinion, a self-adjusting connection between the internal gear and the wheel with provision for independent lateral movement of the gear, and a detent for holding the eccentric stationary.

2. In a bicycle, the combination of a driven wheel having a casing on its hub, a sleeve loose on the said hub and provided with a driving pinion within the casing, an eccentric loose on the sleeve within the casing, an internal gear journaled on said eccentric and in mesh with the driving pinion, a self-adjusting connection between the internal gear and the casing with provision for lateral movement of the gear, and a detent for holding the eccentric stationary.

3. In a bicycle, the combination of a driven wheel having a casing on its hub, a sleeve loose on the said hub and provided with a driving pinion within the casing, an eccentric loose on the sleeve within the casing, an internal gear journaled on said eccentric and in mesh with the driving pinion and having an arm or projection and an anti-friction roll thereon, a slotted arm on the casing receiving said roll, and a detent for holding the eccentric stationary.

4. In a bicycle, the combination of a driven wheel having a casing on its hub, a sleeve loose on the hub of the wheel and provided with a driving pinion within the casing, an eccentric loose on the sleeve within the casing and carrying a flange outside the casing, an internal gear journaled on the eccentric and in mesh with the driving pinion, a self-adjusting connection between the internal gear and the wheel with provision for lateral movement of the gear, and a detent supported by the frame of the bicycle and adapted to engage the eccentric-flange.

5. In a bicycle, the combination of a driven wheel, a sleeve loose on the hub of the wheel and carrying a driving pinion, an eccentric loose on the sleeve, an internal gear journaled on said eccentric and in mesh with the driving pinion, a self-adjusting connection between the said internal gear and the wheel with provision for lateral movement of the gear, a detent for holding the eccentric stationary, and a coupler for locking the eccentric to the wheel.

6. In a bicycle, the combination of a driven wheel, a sleeve loose on the hub of the wheel and carrying a driving pinion, an eccentric loose on the sleeve, an internal gear journaled on said eccentric and in mesh with the driving pinion, a self-adjusting connection between the said internal gear and the wheel with provision for lateral movement of the gear, a detent for holding the eccentric stationary, a coupler for locking the eccentric to the wheel, and means for displacing the coupler when the detent is operated to hold the eccentric stationary.

7. In a bicycle, the combination of a driven wheel having a casing on its hub, a sleeve loose on the hub of the wheel and extending into the said casing where it carries a driving pinion, an eccentric loose on the sleeve within the casing, an internal gear journaled on said eccentric and in mesh with the driving pinion, a self-adjusting connection between the said internal gear and the casing, a coupler carried by the eccentric and adapted to interlock with the casing, a detent on the frame of the bicycle and adapted to engage the eccentric, means whereby the coupler is displaced when the detent is applied, and an operating rod or device on the frame connected with said detent, substantially as and for the purpose described.

8. In a safety bicycle, the combination of a driven wheel, a driving pinion loose on the hub of said wheel, a rotatable eccentric having the same axis as the pinion and wheel and provided with a flange, an internal gear journaled on the eccentric and meshing with the driving pinion, a self-adjusting connection between the internal gear and the wheel, a band brake supported by the frame of the bicycle and encircling the flange on the eccentric, and means for applying the brake to said flange.

9. In a safety bicycle, the combination of a driven wheel, a driving pinion loose on the hub of said wheel, a rotatable eccentric having the same axis as the pinion and wheel and provided with a flange, an internal gear journaled on the eccentric and meshing with the driving pinion, a self-adjusting connection between the internal gear and the wheel, a detent supported by the frame of the bicycle adjacent to the flange on the eccentric, and means for locking said detent to the frame in its operative position.

10. In a safety bicycle, the combination of a driven wheel, a driving pinion loose on the hub of said wheel, a rotatable eccentric having the same axis as the pinion and wheel and provided with a flange, an internal gear journaled on the eccentric and meshing with the driving pinion, a self-adjusting connection between the internal gear and the wheel, a detent supported by the frame of the bicycle adjacent to the flange on the eccentric, an operating device extending from the detent along the frame of the bicycle, and means for locking said operating device to the frame to hold the detent in its operative position.

11. In a bicycle, the combination of a driven wheel, a casing affixed to the hub of said wheel and provided with a corrugated internal surface, a sleeve loose on said hub and provided with a driving pinion, an eccentric loose upon the sleeve and carrying a movable spring-pressed coupler formed to engage the corrugated surface of the casing, an internal gear journaled on said eccentric and in mesh with the driving pinion, a self-adjusting connection between the internal gear and casing, a detent for holding the eccentric stationary, and means for displacing the coupler when the detent is applied.

12. In a bicycle, the combination of a driven wheel, a casing affixed to the hub of said wheel and provided with a corrugated internal surface, a sleeve loose on said hub and provided with a driving pinion, an eccentric loose upon the sleeve and provided with a flange, a spring-pressed coupler movable on said flange into and out of engagement with the corrugated surface of the casing and provided with a stud projecting through a slot in said flange, a band brake encircling the flange and arranged to press upon said stud when compressed, means for operating said brake, an internal gear journaled on the eccentric and in mesh with the driving pinion, and a self-adjusting connection between the internal gear and casing.

13. In a bicycle, the combination of the axle, the frame secured thereto, the arm $c'$ secured to the frame and axle, the driven wheel rotatable on the axle, the casing affixed to the hub of the wheel, the loose sleeve having the driving pinion, the loose eccentric having an internal gear at one end and a flange at the other end adjacent to said arm, and a detent supported by said arm in position to engage said flange.

In testimony whereof I have signed my name to this specification, in the presence of two subscribing witnesses, this 12th day of March, A. D. 1895.

VICTOR BÈLANGER.

Witnesses:
E. BATCHELDER,
K. G. COLLINS.